(12) United States Patent
Nakaoka

(10) Patent No.: US 11,977,294 B2
(45) Date of Patent: May 7, 2024

(54) DISPLAY DEVICE

(71) Applicant: Japan Display Inc., Tokyo (JP)

(72) Inventor: Chikyu Nakaoka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/353,941

(22) Filed: Jul. 18, 2023

(65) Prior Publication Data
US 2024/0027831 A1    Jan. 25, 2024

(30) Foreign Application Priority Data

Jul. 20, 2022 (JP) ................................ 2022-115471

(51) Int. Cl.
*G02F 1/1335* (2006.01)
*G02F 1/13357* (2006.01)

(52) U.S. Cl.
CPC .. *G02F 1/133607* (2021.01); *G02F 1/133504* (2013.01); *G02F 1/133603* (2013.01)

(58) Field of Classification Search
None
See application file for complete search history.

(56) References Cited

U.S. PATENT DOCUMENTS

| | | | |
|---|---|---|---|
| 2005/0041174 A1 | 2/2005 | Numata et al. | |
| 2005/0062928 A1 | 3/2005 | Yau et al. | |
| 2017/0059961 A1* | 3/2017 | Park | G02F 1/133621 |
| 2018/0252964 A1 | 9/2018 | Nakaoka et al. | |
| 2018/0306965 A1* | 10/2018 | Fattal | H04N 13/351 |
| 2022/0026761 A1 | 1/2022 | Nakaoka et al. | |

* cited by examiner

*Primary Examiner* — Phu Vu
(74) *Attorney, Agent, or Firm* — Michael Best & Friedrich LLP

(57) ABSTRACT

According to one embodiment, in the display device, on the substrate opposed the liquid crystal panel, an element is formed by grooves having steps in a minute and periodic pattern, and the element separates the backlight from the light source unit into light of different color wavelengths and diffract them toward the corresponding color subpixels of the liquid crystal panel. In the light source unit, the first lens shapes the incident light from the light source according to the shape of the display surface of the panel, and the second lens irradiates the light incident surface of the substrate with the light shaped by the first lens as the backlight.

20 Claims, 16 Drawing Sheets

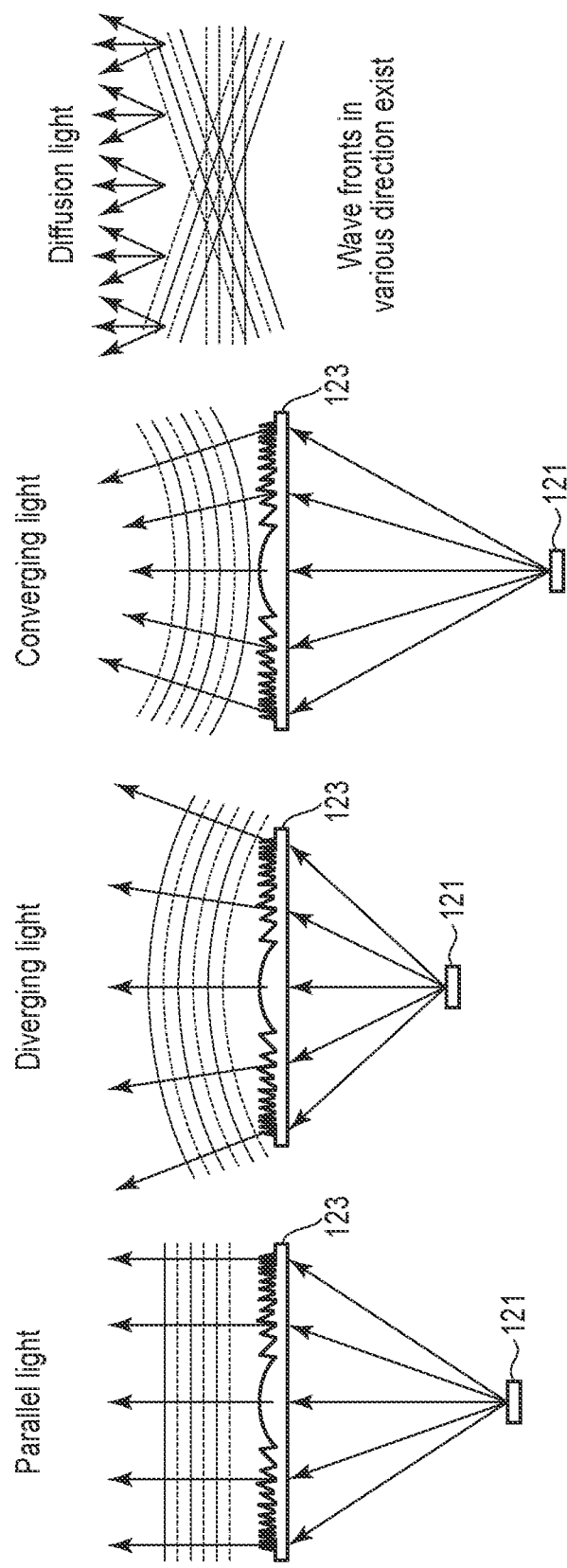

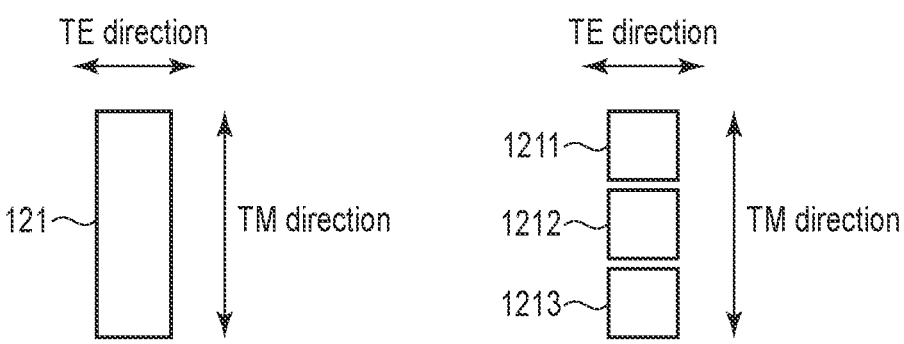
F I G. 6A    F I G. 6B

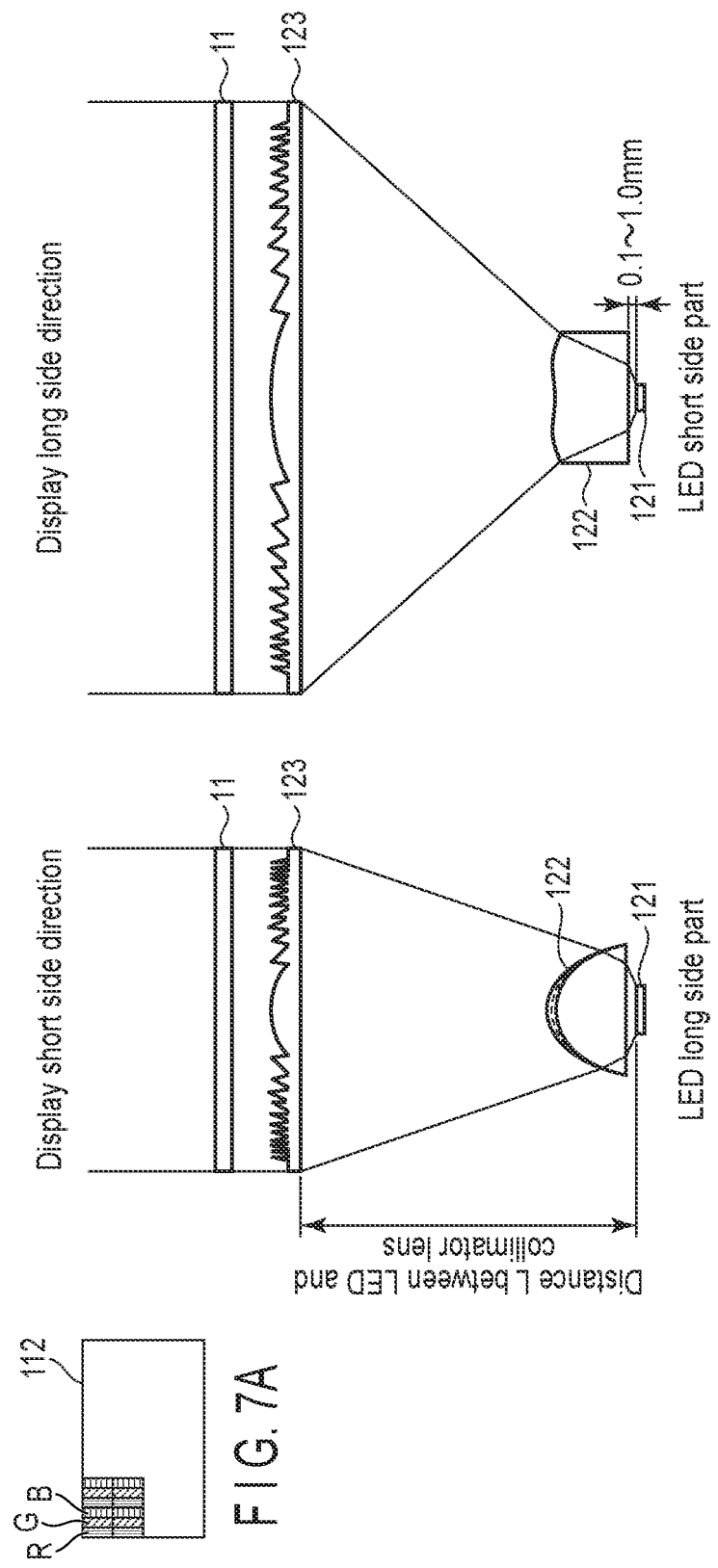

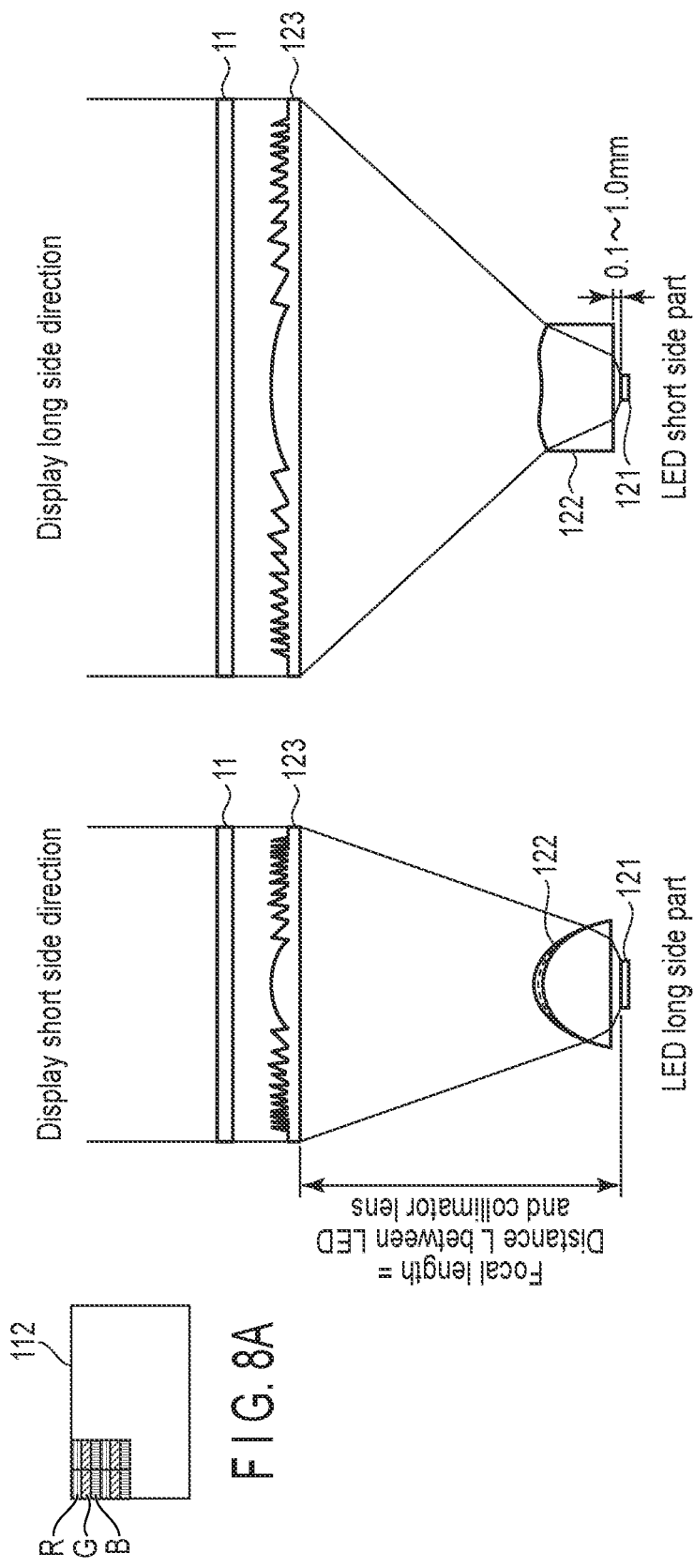

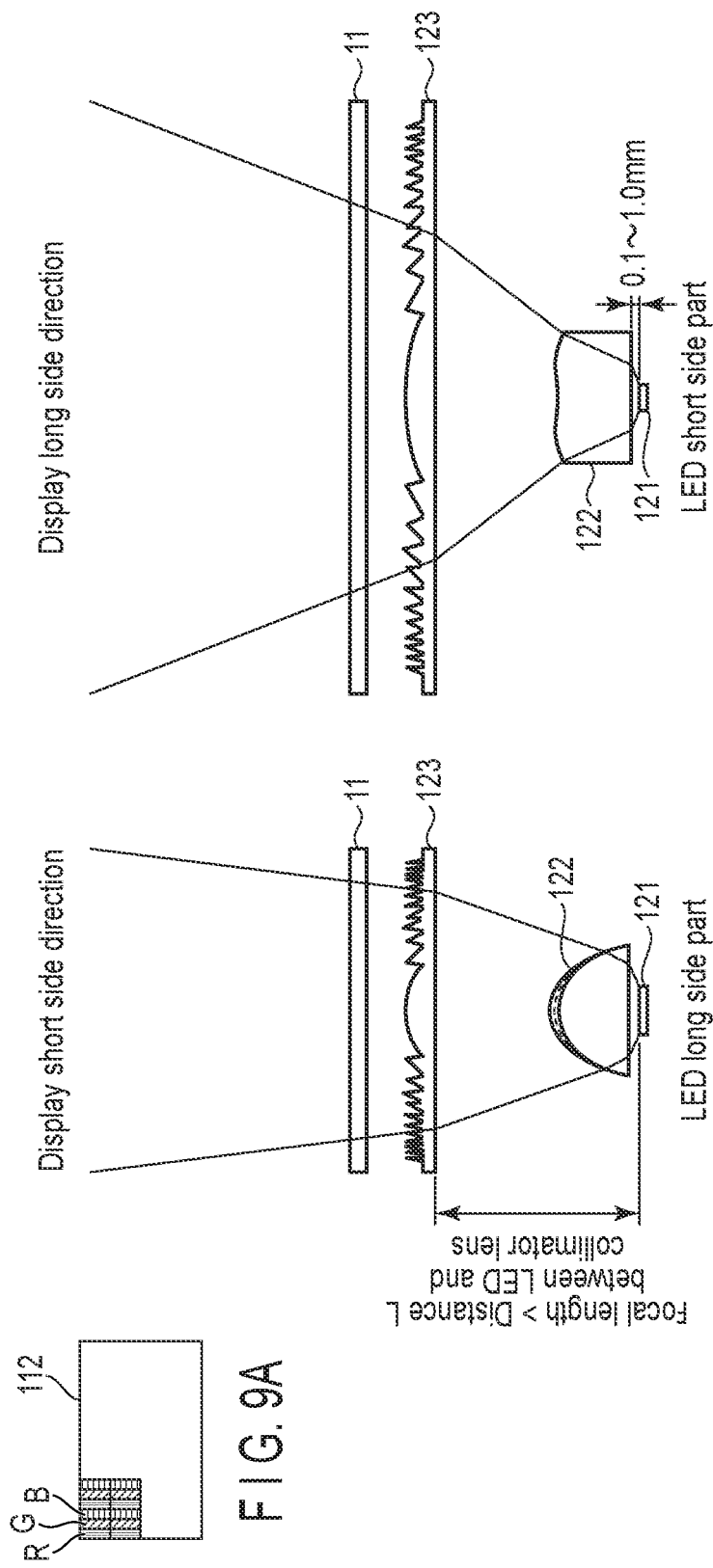

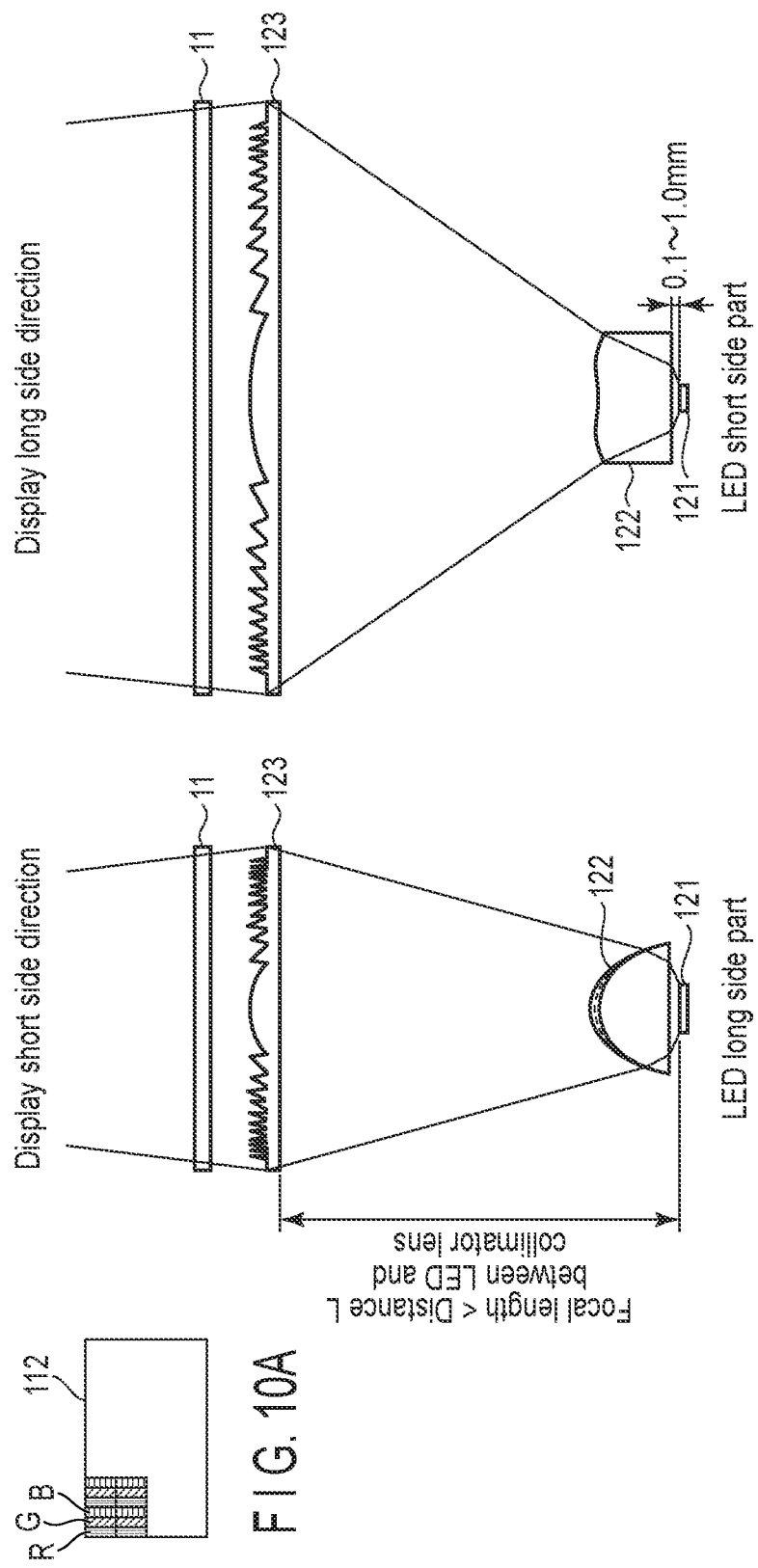

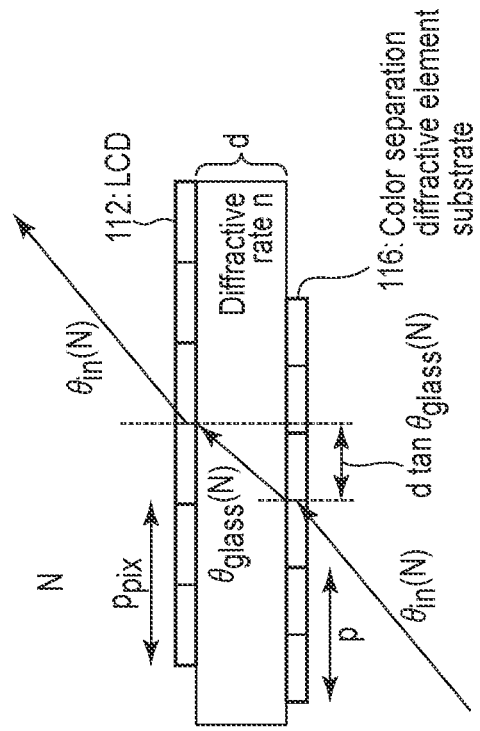
F I G. 13B
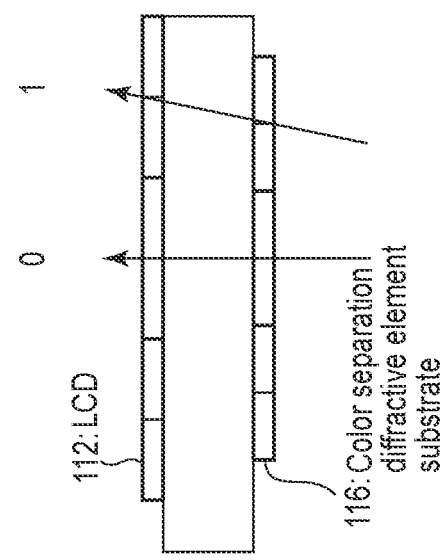
F I G. 13A

DISPLAY DEVICE

CROSS-REFERENCE TO RELATED APPLICATIONS

This application is based upon and claims the benefit of priority from Japanese Patent Application No. 2022-115471, filed Jul. 20, 2022, the entire contents of which are incorporated herein by reference.

FIELD

Embodiments described herein relate generally to a display device using a color separation diffractive element technique.

BACKGROUND

Color filter (CF) type display devices used for liquid crystal display modules include a liquid crystal panel in which RGB CFs are formed per subpixel (a panel in which a CF substrate is layered on a liquid crystal thin-film-transistor (TFT) substrate) wherein white backlight is incident on each of RGB filters in the panel, CF color wavelength light passes the filters, and wavelength light of color other than the CF colors is absorbed. Thus, effectiveness of light usage becomes low. Therefore, in order to increase the effectiveness of light usage, a light separation diffractive element technique has been proposed.

The color separation diffractive element technique uses a substrate including color separating grooves with minute asperity particularly patterned for each RGB color (hereinafter, referred to as color separation diffractive element substrate) formed on the surface of a glass substrate as a color separation diffractive element such that white backlight incident thereon from the back surface is separated per wavelength component, and light of each separated wavelength component is diffracted to a specific direction to be emitted from the surface.

According to the above technique, in a CF type display device, the color separation diffractive element substrate is disposed between a light source of the white backlight and a liquid crystal panel, and the backlight (white light) is separated into wavelengths corresponding to each of RGB CFs by the color separation diffractive elements, wherein the separated wavelengths are diffracted in a certain direction per color, and the light of wavelength corresponding to CFs alone can be incident upon the filter of each of RGB of the liquid crystal panel. Therefore, absorption of light of wavelength other that those corresponding to the CFs can be decreased, thereby aiming improved effectiveness of usage of light (brightness).

However, in actuality, light beams of colors which have been separated/diffracted by the color separation diffractive elements may not be concentrated to subpixels of corresponding colors because of a distance between the light source of the white backlight and the color separation diffractive element substrate, and even a slight shift in the positional relationship. That is, adjustment thereof has been a technical difficulty.

Furthermore, in a display device structured as above, it is required that the white light is separated into three colors of RGB using the color separation diffractive elements, and the light beam of each color is concentrated to corresponding subpixels. Thus, as a condition for the white backlight, wave fronts in the incident direction of each of RGB to the color separation diffractive elements must be coherent to some extent such as parallel light, diverging light, and converging light.

Furthermore, in order to spread the white backlight to a field of view suitable for a head-up display (HUD), an optimal diffusion layer is required in a viewer side of the display device. Especially, devices using a magnifying optical system such as in-car HUD may become more effective when the main axis of light distribution (substantially central angle of light distribution characteristics) is directed to a different direction in a plane of the display area.

BRIEF DESCRIPTION OF THE DRAWINGS

FIG. 2A, FIG. 2B, FIG. 2C, and FIG. 2D each illustrate generation of parallel light, diverging light, converging light, and diffusion light in an optical system of the display device of the embodiment.

FIG. 6A and FIG. 6B each illustrate an example of a light-emitting diode (LED) light source used in the optical system of the display device of the embodiment.

FIG. 7A, FIG. 7B, and FIG. 7C illustrate a state where parallel light from the optical system is taken at the maximum with respect to a short side direction and a long side direction in a case where a display area of the display device of the embodiment is a rectangle, and RGB color difference direction (TE) is in the long side direction of the display area.

FIG. 8A, FIG. 8B, and FIG. 8C illustrate a state where parallel light from the optical system is taken at the maximum with respect to a short side direction and a long side direction in a case where a display area of the display device of the embodiment is a rectangle, and RGB color difference direction (TE) is in the short side direction of the display area.

FIG. 9A, FIG. 9B, and FIG. 9C illustrate a state where diverging light from the optical system is taken at the maximum with respect to a short side direction and a long side direction in a case where a display area of the display device of the embodiment is a rectangle, and RGB color difference direction (TE) is in the long side direction of the display area.

FIG. 10A, FIG. 10B, and FIG. 10C illustrate a state where converging light from the optical system is taken at the maximum with respect to a short side direction and a long side direction in a case where a display area of the display device of the embodiment is a rectangle, and RGB color difference direction (TE) is in the long side direction of the display area.

FIG. 13A and FIG. 13B each illustrate the optical system of the display device of the embodiment, illustrating a relationship between a color separation asperity period and a pixel period when the parallel light diverging light conversing light is used.

DETAILED DESCRIPTION

Figure 1B:
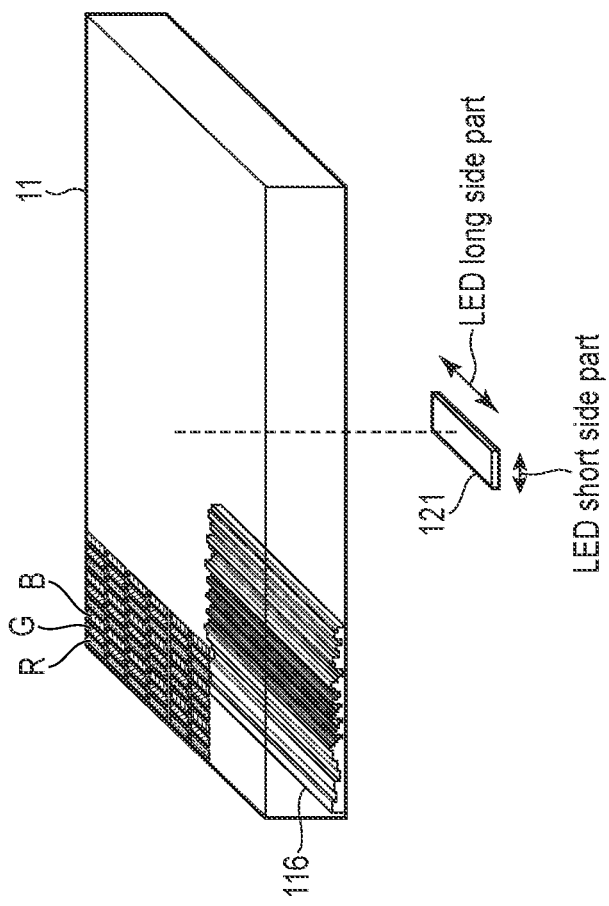
FIG. 1A and FIG. 1B each illustrate the structure of a display device of the embodiment in an optical system.

In general, according to one embodiment, a display device includes a liquid crystal panel, a color separation diffractive element substrate and a light source unit. The liquid crystal panel includes a plurality of subpixels each displaying different colors are arranged in a first direction and a plurality of subpixels displaying a same color are arranged in a second direction crossing the first direction with a display area. The color separation diffractive element substrate is opposed to the liquid crystal panel, grooves having steps in a minute and periodic pattern are formed on a surface of the substrate as color separation diffractive element, light is incident from the light incident surface on the back side of the substrate, the incident light is separated into different color wavelengths displayed by the plurality of subpixels and diffracted toward the corresponding color subpixels by the color separation diffractive element. The light source unit irradiate the light onto the light incident surface on the back side of the color separation diffractive element substrate. The light source unit includes a light source for emitting the light, a first lens on which the light emitted from the light source is incident, the incident light is shaped the incident light according to the shape of the display area of the liquid crystal panel, and the emitted light is incident, and a second lens on which the light emitted from the first lens is incident, and irradiates the light incident surface of the color separation diffractive element substrate.

With the aforementioned structure, a distance between the light source unit and the color separation diffractive element substrate, and a positional relationship thereof can be easily adjusted such that incident directions from the color separation diffractive element substrate to the subpixels of multiple colors are properly set.

Various embodiments will be described hereinafter with reference to the accompanying drawings.

The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

First, referring to FIGS. 15A, 15B, and 16, the structure of an optical system of a CF type display device utilizing a light separation diffractive element technique applied to the embodiment will be explained.

Figures 15A, 15B:
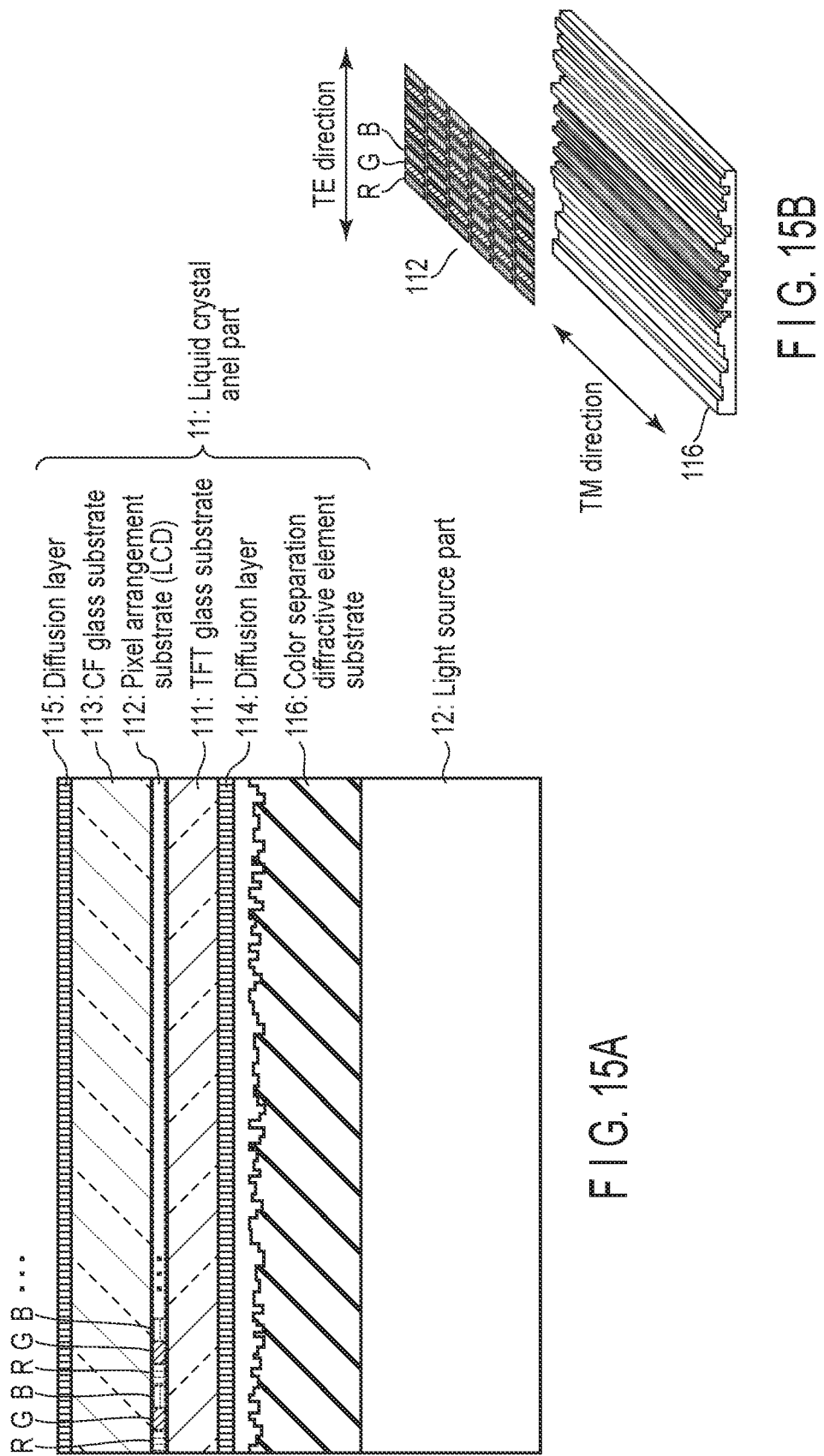
FIG. 15A and FIG. 15B are a cross-sectional view and a perspective view, respectively, of the structure of the optical system of the display device to which the embodiment is applied.
Figure 16:
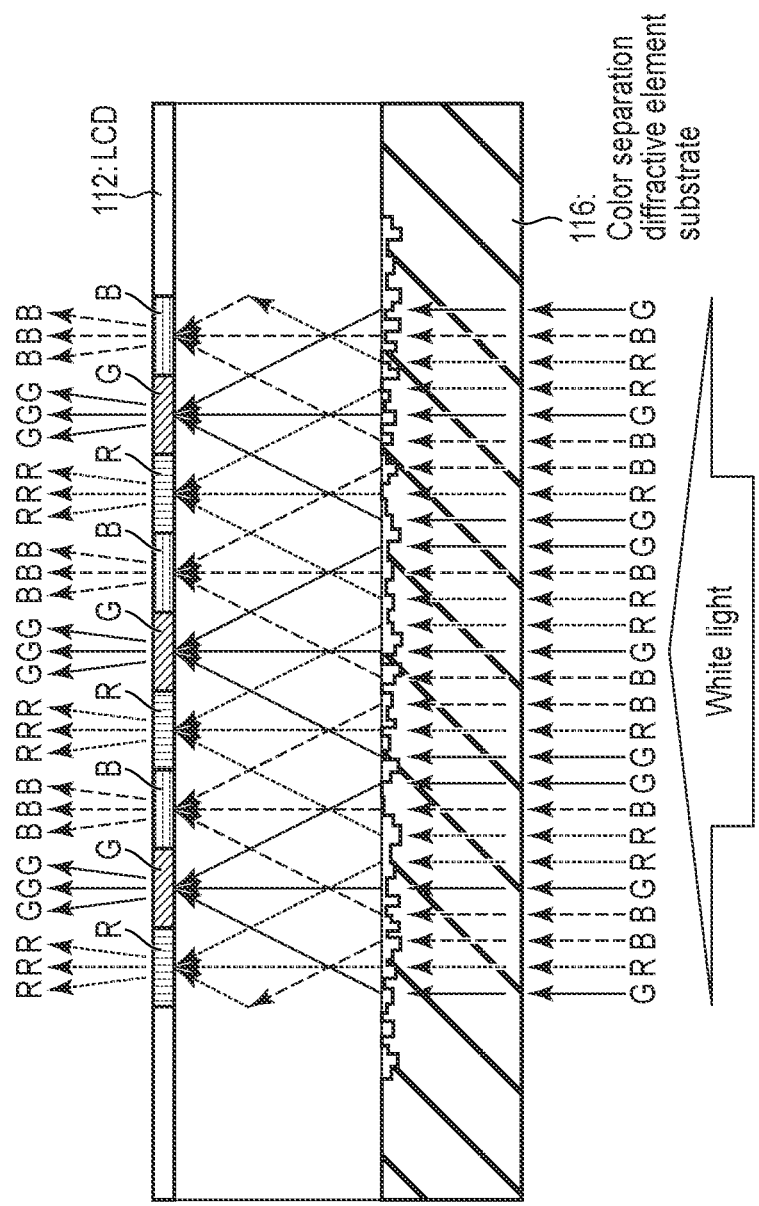
FIG. 16 is a cross-sectional view of a separation diffractive circuit of each of RGB by the color separation diffractive element substrate of the display device to which the embodiment is applied.

FIG. 15A is a cross-sectional view of the structure of the optical system of the display device applied to the embodiment, FIG. 15B is a perspective view of the structure of arrangement of a light separation diffractive element substrate and a CF substrate of the display device of FIG. 15A, and FIG. 16 is a cross-sectional view of a separation diffractive circuit of each of RGB of a color separation diffractive element substrate of the display device to which the embodiment is applied.

The optical system of the display device of FIG. 15A includes a light source part 12 which emits white light in a lower part of a liquid crystal panel part 11. The liquid crystal panel part 11 includes a TFT glass substrate 111, pixel arrangement substrate (LCD) 112, and CF glass substrate 113 which are layered therein, and diffusion layers 114 and 115 are layered below the TFT glass substrate 111 and above the CF glass substrate 113, respectively. Furthermore, a color separation diffractive element substrate 116 (or may be referred to as color separation element substrate or color separation element) is disposed in a lower surface side of the diffusion layer 114.

The RGB pixel arrangement of the pixel arrangement substrate 112 is structured such that, as in FIG. 15B, RGBs are arranged in this order (subpixel order) in a first direction (TE direction), and the same pixels, that is, same color subpixels are arranged in a second direction (TM direction) which is orthogonal to the first direction, and such a structure will be referred to as a stripe structure. Furthermore, the color separation diffractive element substrate 116 includes, as in FIG. 15B, grooves with minute and periodic pattern steps formed in the TE direction and extended in the TM direction as a color separation diffractive element.

That is, in the display device structured as in FIG. 16, when a surface light source with coherent wave fronts of white light (parallel light or the like) is incident from the light source part 12 onto the color separation diffractive element substrate 116, the light is separated into three colors of RGB by diffraction/interference effects by minute and periodic pattern steps of the color separation diffractive element (groove formed part), and the colors are concentrated to corresponding RGB subpixels of the pixel arrangement substrate 112. Thus, absorption by CF in each pixel is suppressed at minimum, and transmissivity of a transmissive color liquid crystal can be significantly increased.

Note that, in order to spatially separate the incident light from the light source part 12 into three RGB colors of the pixel arrangement substrate 112 by the color separation diffractive element substrate 116, as in FIG. 16, parallel light is required as a light source, and as a condition for the white backlight, wave fronts of different RGB colors are required to be coherent to some extent such as parallel light, diverging light, and converging light. Furthermore, in order to spread the white backlight to a suitable field of view in a head-up display (HUD), a suitable diffusion layer is required in a viewer side of the liquid crystal display. Furthermore, in a device such as an in-car HUD using a magnifying optical system, the main axis of light distribution (substantial central angle of light distribution characteristics) should face different directions in a plane of the display area for better effectiveness.

Thus, the present application presents a structure of the light source part 12 as a white backlight formed with a LED light source and two lenses, by which a direct LED light source suitable for the white backlight of the LCD device using color separation diffractive elements and a light diffusion method thereof can be achieved.

Figure 1A:
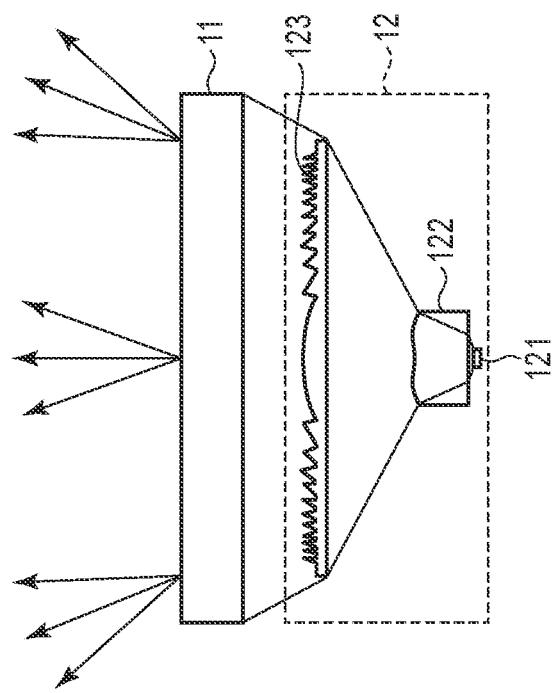
Figure 3:
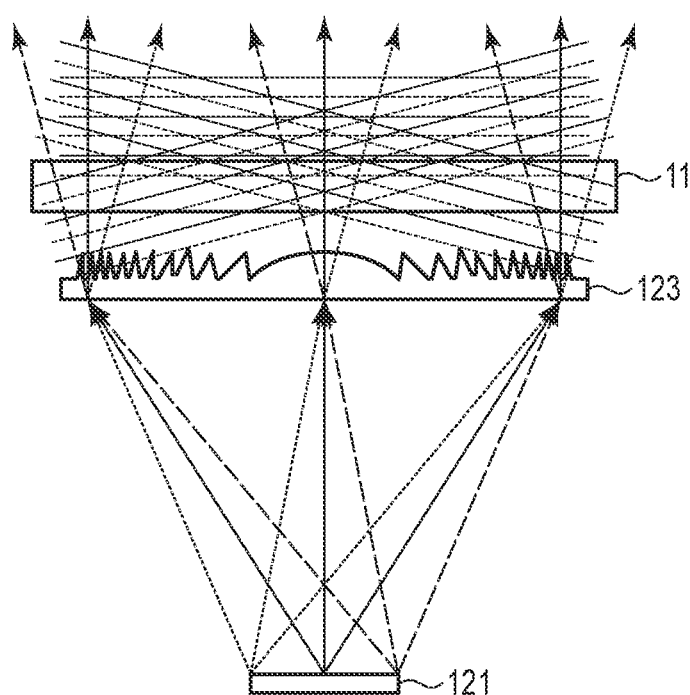
FIG. 3 illustrates a condition in which wave fronts are coherent in the optical system of the display device of the embodiment.
Figure 4C:
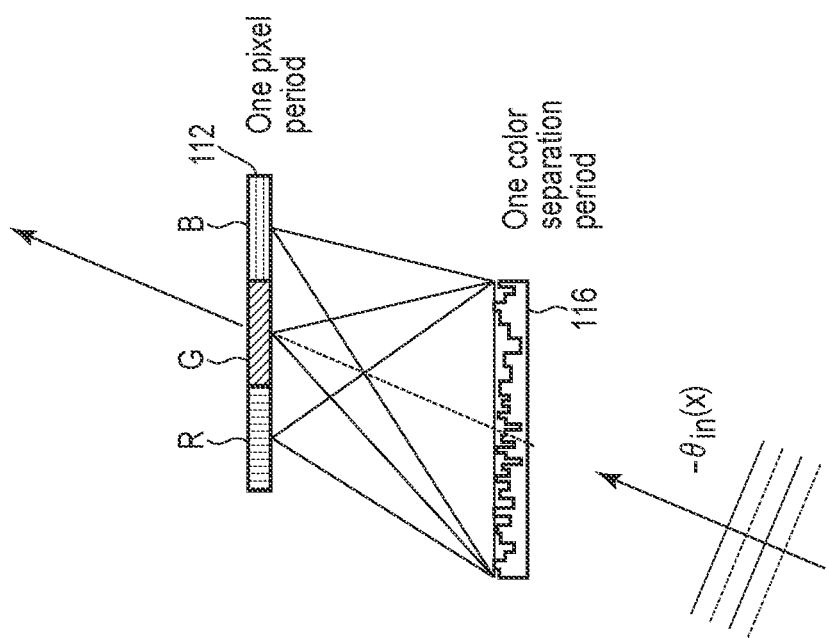
FIG. 4A, FIG. 4B, and FIG. 4C each illustrate exit directions at a time when the wave fronts of optimal light are coherent in a part of one color separation period with respect to one pixel period the optical system of the display device of the embodiment.
Figure 4B:
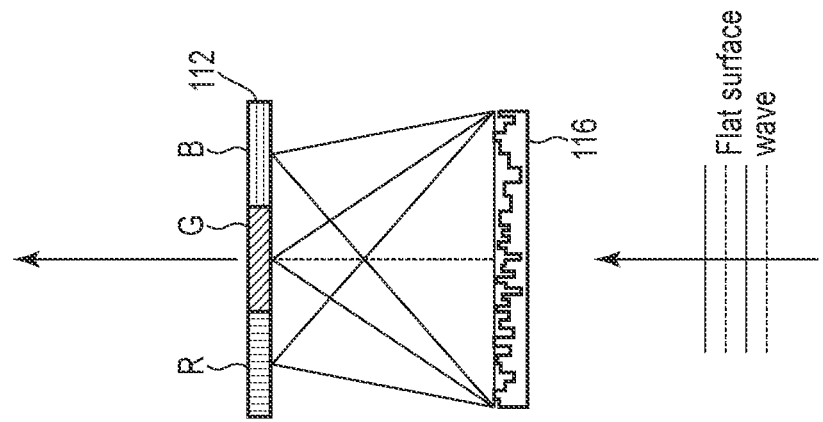
Figure 4A:
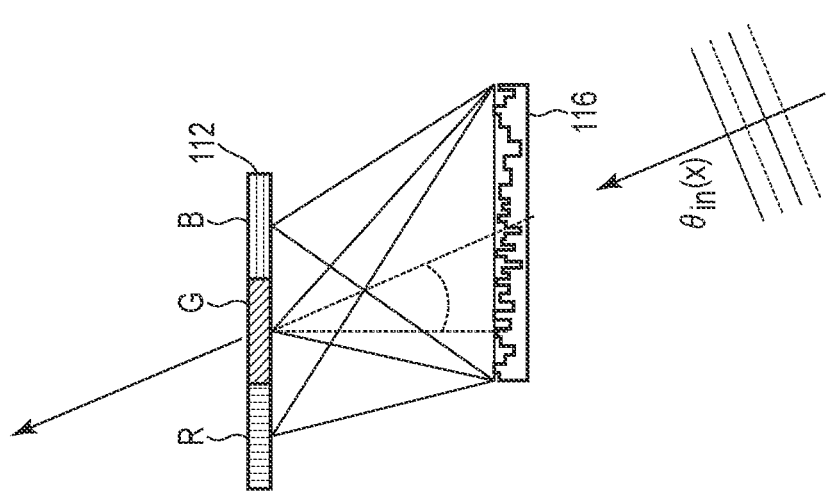
Figure 5:
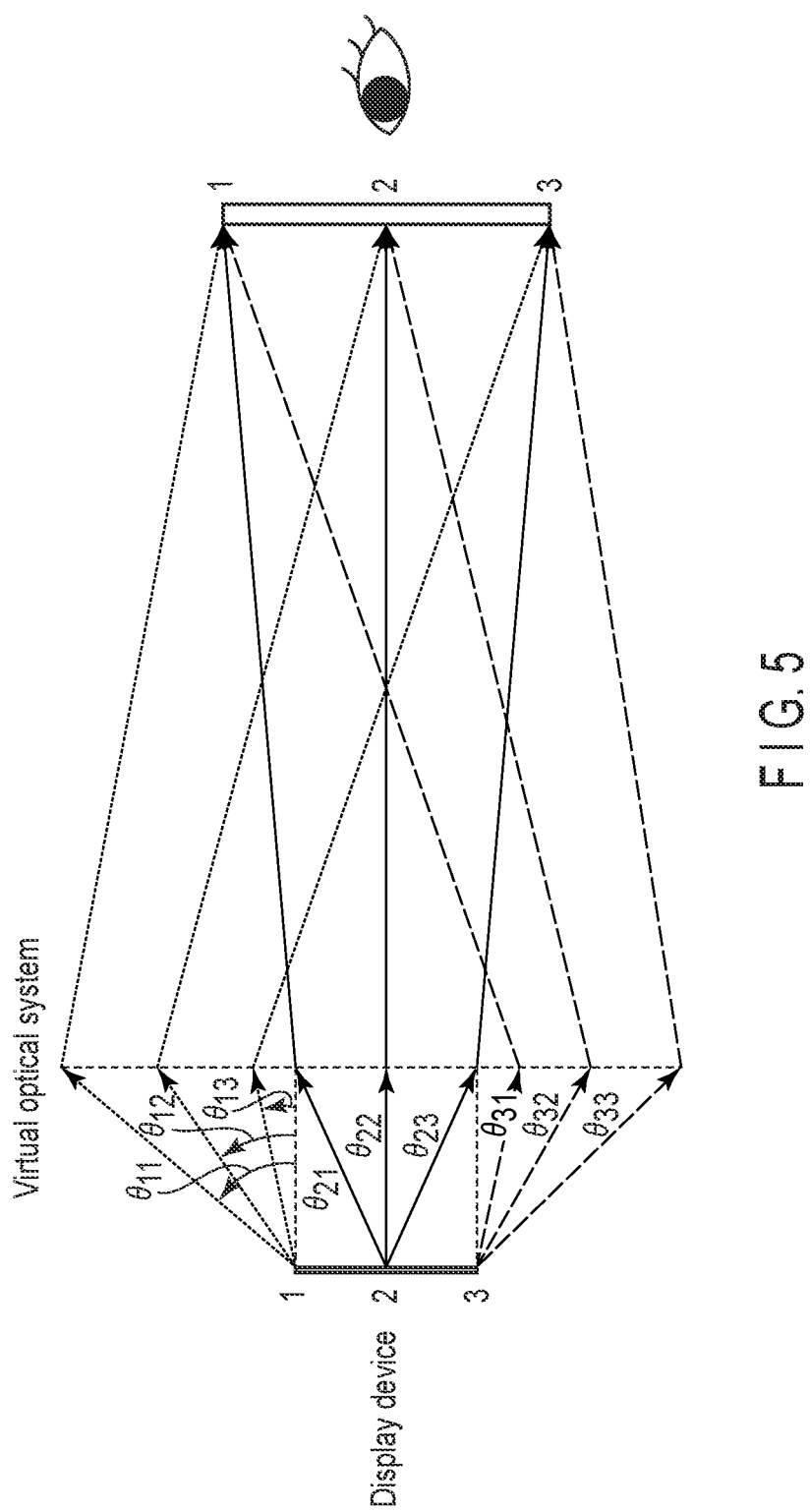
FIG. 5 illustrates a light passage in a case where the optical system of the display device of the embodiment is applied to a virtual image optical system of a HUD.

FIGS. 1A and 1B each illustrate the structure of an optical system of the display device of the present embodiment. FIGS. 2A, 2B, 2C, and 2D each illustrate generation of parallel light, diverging light, converging light, and diffusion light in the optical system of the display device of the embodiment. FIG. 3 illustrates a condition in which wave fronts are coherent in the optical system of the display device of the embodiment. FIGS. 4A, 4B, and 4C each illustrate exit directions at a time when the wave fronts of optimal light are coherent in a part of one color separation period with respect to one pixel period the optical system of the display device of the embodiment. FIG. 5 illustrates a light passage in a case where the optical system of the display device of the embodiment is applied to a virtual image optical system of a HUD. In FIGS. 1A, 1B, 2A, 2B, 2C, 2D, 3, 4A, 4B, 4C, and 5, the same elements as in FIGS. 15A and 15B are referred to by the same reference numbers, and only different parts will be described in this example.

In FIG. 1A, the light source part 12 includes an LED light source 121, light distribution control lens 122, and collimator lens 123. The LED light source 121 emits white light by light emitting diode (LED). The light distribution lens 122 is a lens forming an area where white light from the LED light source 121 is distributed into a substantially rectangular display area (display area of the liquid crystal panel part 11). The collimator lens 123 is a lens which converts the white light formed by the light distribution lens 122 into parallel light as in FIG. 2A, wherein, by adjusting the position thereof (a distance from the LED light source 121), the light can be converted into diverging light as in FIG. 2B or into converging light as in FIG. 2C. Furthermore, when diffusion light (wave fronts in various directions are mixed therein) is generated as in FIG. 2D, the wave fronts are coherent based on an incident position as in FIG. 3. The suitable light source is, preferable, light with coherent wave fronts per pixel in one color separation period part as in converging light $\theta_{in}(x)$ of FIG. 4A, parallel light of FIG. 4B, and diverging light $-\theta_{in}(x)$ of FIG. 4C. Especially, in a HUD with a virtual image optical system, as in FIG. 5, light emitting optical axes of a display area upper end 1, display area center 2, and display area lower end 3 of the display device are adjusted to be θ11, θ12, θ13, θ21, θ22, θ23, θ31, θ32, and θ33. In that case, the outward light going toward a proper center of view of a driver increases in the outer display area, and thus, substantially the same brightness is acknowledged in driver viewpoints 1, 2, and 3. At that time, a diffusion layer 114 is provided with a lower surface side (backlight side) of the liquid crystal panel part 11 in order to distribute sufficient light for the proper view. Note that, one diffusion layer 114 or 115 may suffice the above.

Here, referring to FIGS. 6A, 6B, 7A, 7B, 7C, 8A, 8B, 8C, 9A, 9B, 9C, 10A, 10B, and 10C, structural elements of the light source part 12 will be explained. Note that, FIGS. 6A and 6B each illustrate an example of a light-emitting diode (LED) light source used in the optical system of the display device of the embodiment. FIGS. 7A, 7B, and 7C illustrate a state where parallel light from the optical system is taken at the maximum with respect to a short side direction and a long side direction in a case where a display area of the display device of the embodiment is a rectangle, and RGB color difference direction (TE) is in the long side direction of the display area. FIGS. 8A, 8B, and 8C illustrate a state where parallel light from the optical system is taken at the maximum with respect to a short side direction and a long side direction in a case where a display area of the display device of the embodiment is a rectangle, and RGB color difference direction (TE) is in the short side direction of the display area. FIGS. 9A, 9B, and 9C illustrate a state where diverging light from the optical system is taken at the maximum with respect to a short side direction and a long side direction in a case where a display area of the display device of the embodiment is a rectangle, and RGB color difference direction (TE) is in the long side direction of the display area. FIGS. 10A, 10B, and 10C illustrate a state where converging light from the optical system is taken at the maximum with respect to a short side direction and a long side direction in a case where a display area of the display device of the embodiment is a rectangle, and RGB color difference direction (TE) is in the long side direction of the display area.

Initially, the LED light source 121 which is a light emitting source of the light source part 12 is a light emitting element which emits white light by a single LED (one set), and has a small area emitting light toward the display area (especially TE direction). A square may be adopted; however, a rectangle may be adopted as in FIG. 6A in order to increase light intensity (to increase a light emission area). Or, as in FIG. 6B, multiple square chips (three in FIG. 3) may be arranged in a tight single line. The LED light source 121 is arranged such that a short side of LED matches an RGB color difference direction (TE) and a long side of LED matches an RGB same color direction (TM).

Next, the light distribution control lens 122 of the light source part 12 has a rectangular incident surface, rectangular cross-section in a long side direction, hemispherical cross-section in a short side direction, and an exit surface with a free-form surface, wherein the incident light from the LED light source 121 is temporarily concentrated in the lens, and is diffused to conform to the display area through the collimator lens 123. FIGS. 7A, 7B, and 7C illustrate an example where the display area of the display device of the embodiment is rectangular, and when the RGB color difference direction (TE) is in the long side direction of the display area as in FIG. 7A, the light from the rectangular LED light source 121 is controlled into parallel light to be absorbed at the maximum with respect to the short side direction of FIG. 7B and the long side direction of FIG. 7C. In this example, the light distribution control lens 122 is disposed in the proximity (0.1 to 1.0 mm) of the LED light source 121 in order to take in as much light as possible to the collimator lens, and a distance L between the LED light source 121 and the collimator lens 123 to be 20 to 50 mm. The light distribution control lens 122 is, preferably, a lens with a free-form surface which can match the light from the LED light source 121 with the incident surface of the collimator lens 123, wherein the luminosity in the rectangular area size of which is the display size can be substantially even in the display arrangement position, and a mean curvature of the light distribution control lens 122 is set as TE direction<TM direction.

FIGS. 8A, 8B, and 8C illustrate an example where the display area of the display device of the embodiment is rectangular, and when the RGB color difference direction (TE) is in the short side direction of the display area as in FIG. 8A, the light from the rectangular LED light source 121 is controlled into parallel light to be absorbed at the maximum with respect to the short side direction of FIG. 8B and the long side direction of FIG. 8C. In that case, a mean curvature of the free-form surface in the light distribution control lens 122 is set as TE direction>TM direction. FIGS. 9A, 9B, and 9C illustrate an example where the display area of the display device of the embodiment is rectangular, and when the RGB color difference direction (TE) is in the long side direction of the display area as in FIG. 9A, the light from the rectangular LED light source 121 is controlled into diverging light to be absorbed at the maximum with respect to the short side direction of FIG. 9B and the long side direction of FIG. 9C. FIGS. 10A, 10B, and 10C illustrate an example where the display area of the display device of the embodiment is rectangular, and when the RGB color difference direction (TE) is in the long side direction of the display area as in FIG. 10A, the light from the rectangular LED light source 121 is controlled into converging light to be absorbed at the maximum with respect to the short side direction of FIG. 10B and the long side direction of FIG. 10C.

Figure 11B:
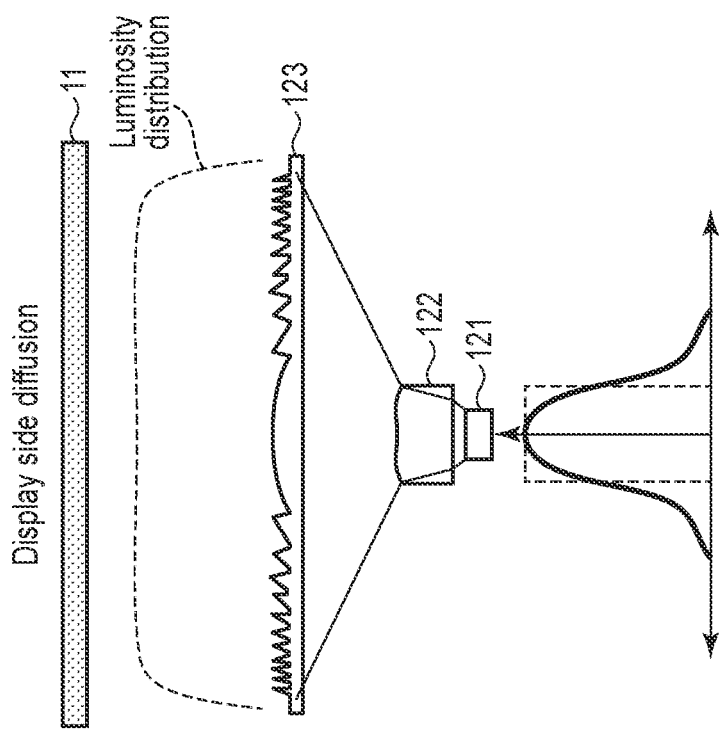
FIG. 11A and FIG. 11B illustrate comparison between the optical system of the display device of the embodiment to an optical system with a direct backlight using a plurality of light sources.
Figure 11A:
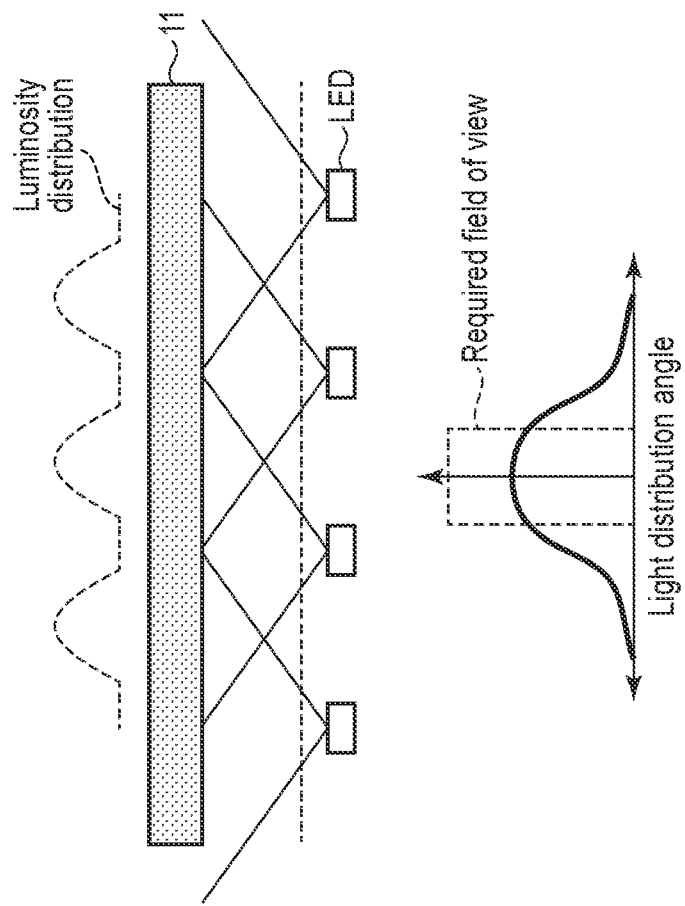

As described above, one LED light source can sufficiently produce proper luminosity in a relatively small display device such as a HUD. Furthermore, when the light from a single LED is distributed to a display size, the unevenness in LED luminosity can be eliminated even without diffusion in the backlight side. Such a state will be explained based on a comparison shown in FIGS. 11A and 11B. FIG. 11A illustrates luminosity distribution of an optical system with a direct backlight using multiple light sources, and FIG. 11B illustrates luminosity distribution of the optical system of the display device of the embodiment. As can be understood from the comparison, according to the present embodiment, substantially even luminosity distribution is achievable in one LED light source 121. Furthermore, with a diffusion layer (115) is provided with the display side of the liquid crystal panel part 11 to diffuse the light into proper view angles, unevenness in the luminosity can be certainly eliminated.

Note that, when performing color separation, wave fronts of the incident light source must be coherent, and on the other hand, the light must be spread in the display side using a diverging light source to cover the field of view of the driver. Thus, in the display device of the present embodiment, the optical system is structured as in FIGS. 12A and 12B.

Figure 12B:
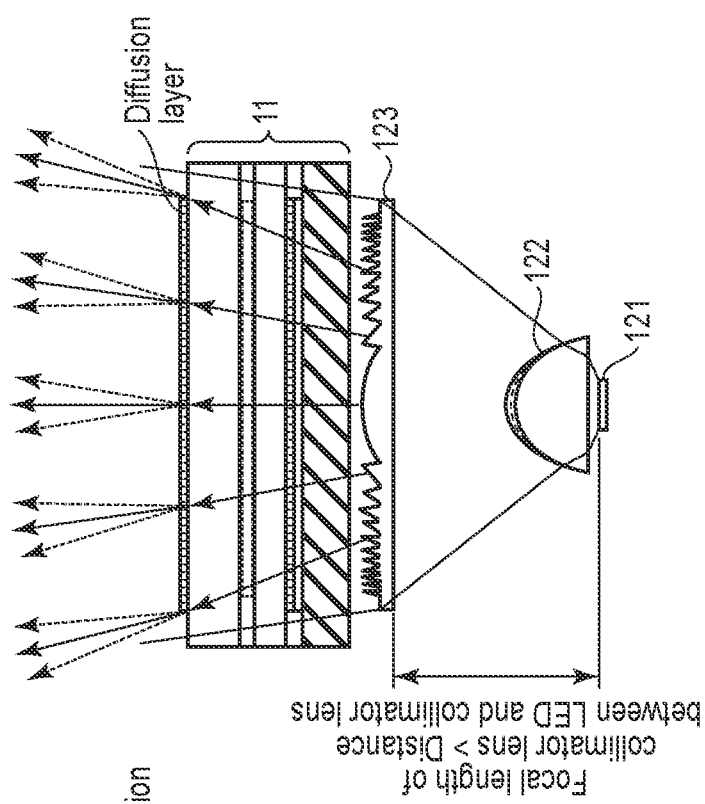
FIG. 12A and FIG. 12B each illustrate the optical system of the display device of the embodiment, in which a diverging light source is used as an incident light source of the color separation diffractive element substrate, and the area is covered with the light diffused in the display side.
Figure 12A:
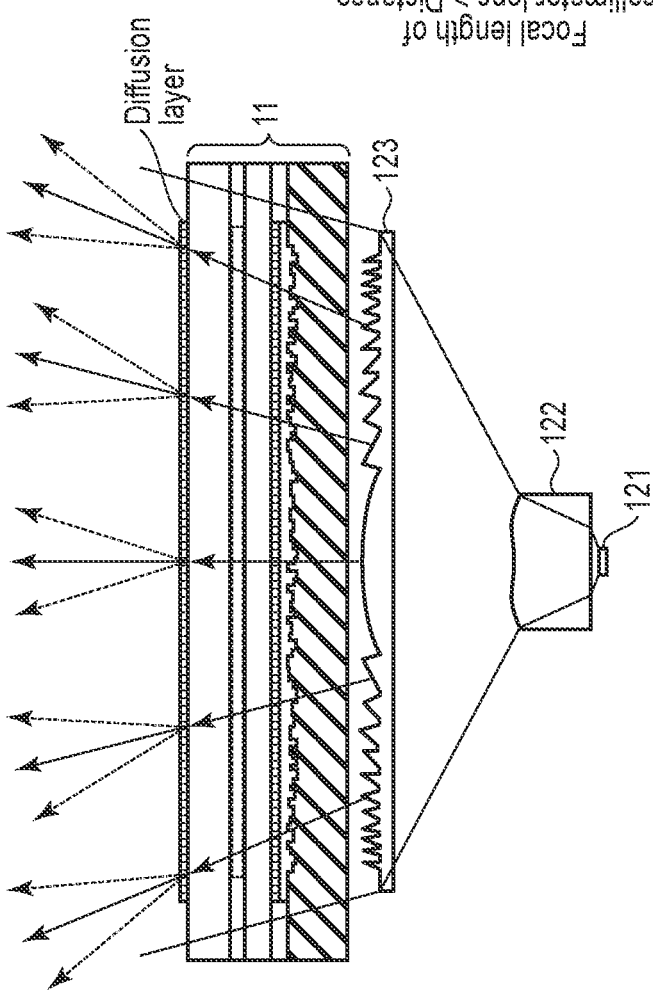

FIGS. 12A and 12B each illustrate a state of the optical system of the display device of the embodiment where a diverging light source including the LED light source 121, light distribution control lens 122, and collimator lens 123 is used as a light source 12 incident on the color separation diffractive element substrate 116, and the light is diffused by the diffusion layer 115 in the display side of the liquid crystal panel part 11 to cover the field of view. FIG. 12A is a cross-sectional view in the long side direction, and FIG. 12B is a cross-sectional view in the short side direction.

As described above, in order to form coherent wave fronts of the incident light source of the color separation diffractive element substrate 116 and to cover the field of view of the driver, in the present embodiment, a focal length of the collimator lens 123 is adjusted to be longer than a distance between the LED light source 121 and the collimator lens 123 as in FIGS. 12A and 12B.

That is, as in FIG. 5, in the optical system using a virtual image optical system such as an HUD, light distributed to one central point of proper field of view of the driver differs in the display plane. Especially, in the HUD use, the light going outward tends to reach the center of the proper field of view out of the light from the outer side of the display area. Based on this tendency, the structure of FIGS. 12A and 12B can satisfy both the coherent wave fronts of the incident light source of the color separation diffractive element substrate 116 and covering the field of view of the driver.

Here, relationships between step pattern period for color separation and diffraction of the color separation diffractive element substrate 116 (hereinafter, period of stepped pattern) and pixel pitch (period of pixel) when parallel light, diverging light, and converging light are used as the display device will be represented as follows.

Parallel light: Pixel pitch=period of stepped pattern
Diverging light: Pixel pitch>period of stepped pattern
Converging light: Pixel pitch<period of stepped pattern For example, a case where diverging light is used is illustrated in FIGS. 13A and 13B. FIG. 13A illustrates a relationship between pixel pitch $p_{pix}$ of LCD 112 and period of stepped pattern p of color separation diffractive element substrate 116 when diverging light is used. Furthermore, FIG. 13B illustrates a condition where the incident angle of the diverging light is maintained in the exiting time in the structure of FIG. 13A.

That is, in FIGS. 13A and 13B, the incident angle of the diverging light is maintained in the exiting time if the period of stepped pattern p for the color separation and diffraction satisfies the following formulae where an angle of the diverging light in Nth period counted from the center is $\theta_{in}(N)$, and thickness of glass substrate is d.

$$p = p_{pix} - \frac{d \cdot \tan\theta_{glass}(N)}{N}$$

$$\sin\theta_{in}(N) = n \cdot \sin\theta_{glass}(N)$$

Figure 14:
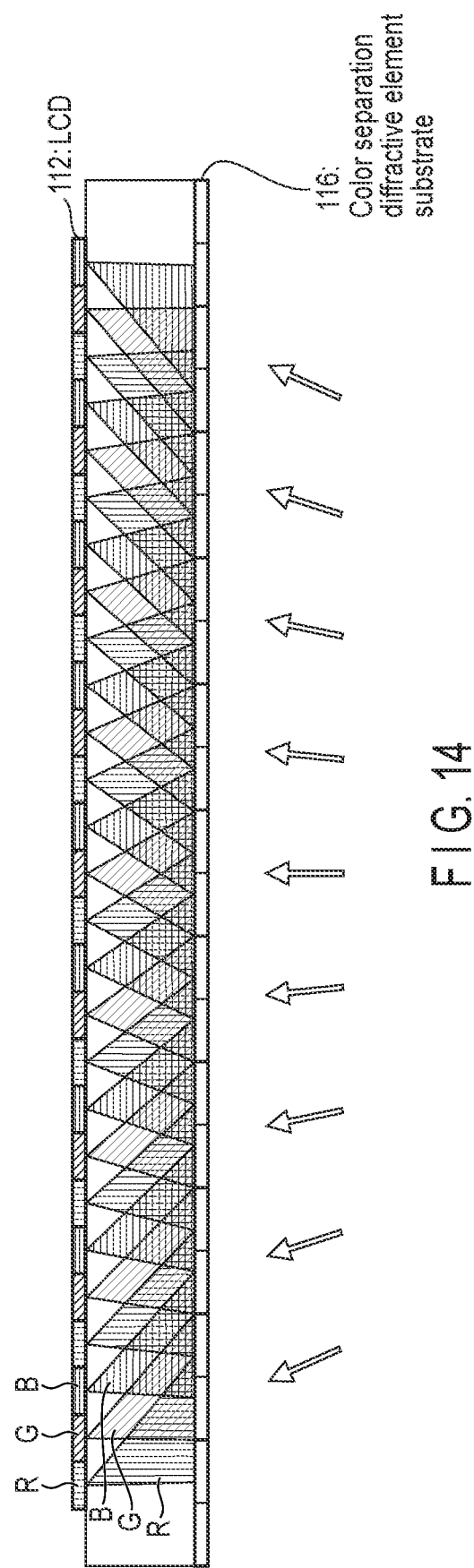
FIG. 14 illustrates a specific example of the color separation asperity period and the pixel period when the diverging light is used in the optical system of the display device of the embodiment.

FIG. 14 illustrates a specific example of the period of stepped pattern for the color separation and diffraction and the period of pixels when the diverging light is used.

As above, in the display device of the present embodiment, parallel characteristics of the incident light is realized as a backlight for the color separation diffractive element due to minute and periodic pattern steps on the color separation diffractive element substrate for a color liquid crystal display device, where a color difference direction of RGB stripe structure and a direction vertical to grooves as the element are especially considered.

Note that, not only parallel light but also diverging light and converging light can be used based on a positional relationship between the LED light source 121 and the collimator lens 123, and the diverging light is especially effective in the HUD use. For example, if a distance from the LED light source 121 to the liquid crystal panel 11 is substantially the same, the wave fronts become more coherent when the light emitting area of the LED light source 121 becomes smaller, and when the light emitting area thereof becomes greater, the wave fronts in various directions are produced resulting in almost diffusion light. Thus, smaller LED light source 121 is a condition for coherent wave fronts. The optimal light source for each of the parallel light, diverging light, and converging light is, preferably, light with coherent wave fronts in one color separation period part.

Furthermore, in the aforementioned embodiment, a subpixel unit including RGB (dot unit) is used as a pair to structure one pixel, that is, three subpixels (three dots) structure one pixel; however, no limitation is intended thereby. For example, four subpixels (four dots) may structure one pixel. Note that, one dot, that is, one subpixel may be referred to as pixel, in some cases.

Lastly, the present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

What is claimed is:

1. A display device comprising:
a liquid crystal panel with a display area in which a plurality of subpixels each displaying different colors are arranged in a first direction and a plurality of subpixels displaying a same color are arranged in a second direction crossing the first direction;
a color separation diffractive element substrate opposed to the liquid crystal panel;
a color separation diffractive element formed on a surface of the color separation diffractive element substrate and including grooves having steps in a minute periodic pattern; and
a light source unit configured to irradiate light onto a light incident surface of the color separation diffractive element substrate, the light incident surface being an opposite side of the surface, wherein
the light is separated into different color wavelengths by the color separation diffractive element,
separated light with one of the different color wavelengths is diffracted toward corresponding one of the plurality of subpixels,
each of the plurality of subpixels display color with corresponding one of the different color wavelengths,
the light source unit includes a light source that emits the light, a first lens on which the light emitted from the light source is incident, and a second lens on which the light emitted from the first lens is incident,
the first lens forms a shape of the light emitted from the light source according to a shape of the display area and emits the light,
the light emitted from the second lens irradiates the light incident surface of the color separation diffractive element substrate.

2. The display device according to claim 1, wherein
the light source includes a light emitting element that emits the light, and
the light emitting element includes a light emitting area shaped in a rectangle, where a short side of the rectangle is along the first direction and a long side of the rectangle is along the second direction.

3. The display device according to claim 1, wherein
the first lens has an incident surface shaped in a rectangle, where a cross-section of the rectangle in a long side direction is substantially rectangular, a cross-section of the rectangle in a short side direction is substantially hemispherical, and an exit surface thereof is a free-form surface, an incident light from the light source is converged, diffused onto an incident surface of the second lens, and emitted.

4. The display device according to claim 3, wherein
the first lens has the display area shaped in a rectangle, and given that the first direction is a long side direction of the display area and the second direction is a short side direction of the display area, a mean curvature of the free-form surface is the first direction<the second direction.

5. The display device according to claim 3, wherein
the first lens has the display area shaped in a rectangle, and given that the first direction is a short side direction of the display area and the second direction is a long direction of the display area, a mean curvature of the free-form surface is the first direction>the second direction.

6. The display device according to claim 1, wherein
the first lens diffuses the incident light from the light source and emits the diffused light to the light incident surface of the second lens, and
the second lens converts the incident light into one of parallel light, diverging light, and converging light, and emits the converted light on an incident surface of the color separation diffractive element substrate.

7. The display device according to claim 6, wherein
the second lens convers the incident light into one of parallel light, diverging light, and converging light based on a distance between the light source and the second lens.

8. The display device according to claim 1, wherein
if any one of parallel light, diverging light, and converging light is incident on the color separation diffractive element substrate as the light from the light source unit, a relationship between a period of the stepped pattern of the grooves formed as the color separation diffractive elements and a period of pixel of the light crystal panel satisfies the following;
parallel light: period of pixel=period of stepped pattern,
diverging light: period of pixel>period of stepped pattern, or
converging light: period of pixel>period of stepped pattern.

9. The display device according to claim 1, wherein
if any one of parallel light, diverging light, and converging light is emitted on the color separation diffractive element substrate as the light, the light source unit forms coherent wave fronts of the corresponding incident light based on one period unit of the periods of the stepped pattern of the grooves formed as the color separation diffractive elements.

10. The display device according to claim 1, wherein
the liquid crystal panel includes a diffusion layer in at least one of the incident surface and the exit surface of the light.

11. The display device according to claim 1, wherein
the light emitted from the light source unit is white light.

12. The display device according to claim 1, wherein
the light source unit is used an LED element.

13. The display device according to claim 1, wherein
a focal length of the second lens is greater than a distance between the light source unit and the second lens.

14. The display device according to claim 1, wherein
the second lens is a collimator lens.

15. A display device comprising:
a liquid crystal panel with a display area;
a color separation element opposed to the liquid crystal panel, configured to separate incident light into a plurality of light beams with different wavelengths;
a light source positioned in an opposite side of the light crystal panel side of the color separation element;
a first lens on which light emitting from the light source is incident; and a second lens on which light emitting from the first lens is incident, configured to irradiate the incident light onto the color separation element, wherein the color separation element separates the light emitted from the second lens into the plurality of light beams, and irradiates the light beams onto the liquid crystal panel.

16. The display device according to claim 15, wherein the liquid crystal panel includes a first subpixel and a second subpixel which display different colors, the plurality of light beams include first separation light illuminating the first subpixel and second separation light illuminating the second subpixel, the first separation light has a color which is the same as with the color displayed by the first subpixel, and the second separation light has a color which is the same as with the color displayed by the second subpixel.

17. The display device according to claim 15, wherein the color separation element has a groove with steps.

18. The display device according to claim 17, wherein the groove includes a stepped pattern arranged periodically.

19. The display device according to claim 18, wherein the liquid crystal panel includes a plurality of subpixels which display different colors, and the stepped pattern which is arranged periodically and the subpixels are disposed in the same direction.

20. The display device according to claim 15, wherein the liquid crystal panel includes a first subpixel and a second subpixel which display different colors and are aligned in a first direction, an exit surface of the first lens includes a first curvature in the first direction and a second curvature in a second direction which crosses the first direction, the second lens is a collimator lens, and a focal length of the second lens is greater than a distance between the light source and the second lens.

* * * * *